United States Patent
Chandler et al.

(10) Patent No.: US 9,464,547 B2
(45) Date of Patent: Oct. 11, 2016

(54) EXHAUST SYSTEM INCLUDING NOX REDUCTION CATALYST AND EGR CIRCUIT

(75) Inventors: Guy Richard Chandler, Cambridge (GB); Alexander Nicholas Michael Green, Baldock (GB); Stuart David Reid, Cambourne (GB)

(73) Assignee: Johnson Matthey Public Limited Company, London (GB)

( * ) Notice: Subject to any disclaimer, the term of this patent is extended or adjusted under 35 U.S.C. 154(b) by 138 days.

(21) Appl. No.: 14/000,686

(22) PCT Filed: Feb. 21, 2012

(86) PCT No.: PCT/IB2012/000308
§ 371 (c)(1),
(2), (4) Date: Aug. 21, 2013

(87) PCT Pub. No.: WO2012/114187
PCT Pub. Date: Aug. 30, 2012

(65) Prior Publication Data
US 2013/0340413 A1 Dec. 26, 2013

Related U.S. Application Data

(60) Provisional application No. 61/444,881, filed on Feb. 21, 2011.

(51) Int. Cl.
*F01N 3/00* (2006.01)
*F01N 3/10* (2006.01)
(Continued)

(52) U.S. Cl.
CPC .......... *F01N 3/021* (2013.01); *B01D 53/9422* (2013.01); *F01N 3/035* (2013.01);
(Continued)

(58) Field of Classification Search
CPC .............. B01D 2251/2067; B01D 2255/1021; B01D 2255/1023; B01D 2255/2065; B01D 2255/20715; B01D 2255/407; B01D 2255/91; B01D 2255/9155; B01D 53/9418; B01D 53/9422; B01D 53/9477; F01N 3/021; F01N 3/035; F01N 3/0814; F01N 3/106; F01N 3/2066; F01N 2560/026; F01N 2570/18; F01N 2610/02; F02M 25/074; Y02T 10/24
USPC ......... 60/276, 278, 286, 295, 297, 301, 303, 60/311
See application file for complete search history.

(56) References Cited

U.S. PATENT DOCUMENTS 6,758,036 B1 * 7/2004 Molinier .......................... 60/286
7,043,901 B2 * 5/2006 Goralski et al. ................ 60/285
(Continued)

FOREIGN PATENT DOCUMENTS

EP 0602865 B1 5/2000
EP 1965050 A1 9/2008
(Continued)

OTHER PUBLICATIONS

International Search Report and Written Opinion for corresponding PCT Patent Application No. PCT/IB2012/000308 dated Aug. 20, 2012.

*Primary Examiner* — Thomas Denion
*Assistant Examiner* — Diem Tran

(57) ABSTRACT

An exhaust system for a vehicular lean burn internal combustion engine that emits oxides of nitrogen (NOx) and particulate matter (PM) is disclosed. The system comprises a NOx reduction catalyst for reducing NOx in the presence of a reductant, means for introducing reductant into a flowing exhaust gas and a source of hydrocarbon reductant, a nitrogenous reductant, and/or hydrogen, a filter for removing PM from exhaust gas flowing in the exhaust system and a low pressure exhaust gas recirculation (EGR) circuit for connecting the exhaust system downstream of the filter to an air intake of the engine. The EGR circuit comprises a lMOx adsorber catalyst (NAC) comprising a NO adsorbent.

36 Claims, 1 Drawing Sheet

(51) Int. Cl.
  *F01N 3/02* (2006.01)
  *F01N 3/021* (2006.01)
  *F01N 3/035* (2006.01)
  *F01N 3/08* (2006.01)
  *F01N 3/20* (2006.01)
  *B01D 53/94* (2006.01)
  *B01J 23/42* (2006.01)
  *B01J 23/44* (2006.01)
  *B01J 23/63* (2006.01)
  *B01J 29/76* (2006.01)
  *B01J 37/02* (2006.01)

(52) U.S. Cl.
  CPC ........... *F01N 3/0814* (2013.01); *F01N 3/106* (2013.01); *F01N 3/2066* (2013.01); *B01D 53/9418* (2013.01); *B01D 53/9477* (2013.01); *B01D 2251/2067* (2013.01); *B01D 2255/1021* (2013.01); *B01D 2255/1023* (2013.01); *B01D 2255/2065* (2013.01); *B01D 2255/20715* (2013.01); *B01D 2255/407* (2013.01); *B01D 2255/91* (2013.01); *B01D 2255/9155* (2013.01); *B01D 2257/404* (2013.01); *B01D 2258/012* (2013.01); *B01J 23/42* (2013.01); *B01J 23/44* (2013.01); *B01J 23/63* (2013.01); *B01J 29/76* (2013.01); *B01J 37/0246* (2013.01); *F01N 2560/026* (2013.01); *F01N 2570/18* (2013.01); *F01N 2610/02* (2013.01); *Y02T 10/121* (2013.01); *Y02T 10/24* (2013.01)

(56) References Cited

U.S. PATENT DOCUMENTS 7,469,531 B2 * 12/2008 Viola ............................... 60/286
8,096,125 B2 * 1/2012 Hepburn et al. ................ 60/286
2011/0061371 A1 * 3/2011 Cavataio et al. ............... 60/286

FOREIGN PATENT DOCUMENTS

| | | |
|---|---|---|
| FR | 2933746 A3 | 1/2010 |
| FR | 2941499 A1 | 7/2010 |
| JP | 2000249003 A | 9/2000 |
| KR | 20100064931 A | 6/2010 |
| WO | 2008047170 A1 | 4/2008 |
| WO | 2012059179 A2 | 5/2012 |

* cited by examiner

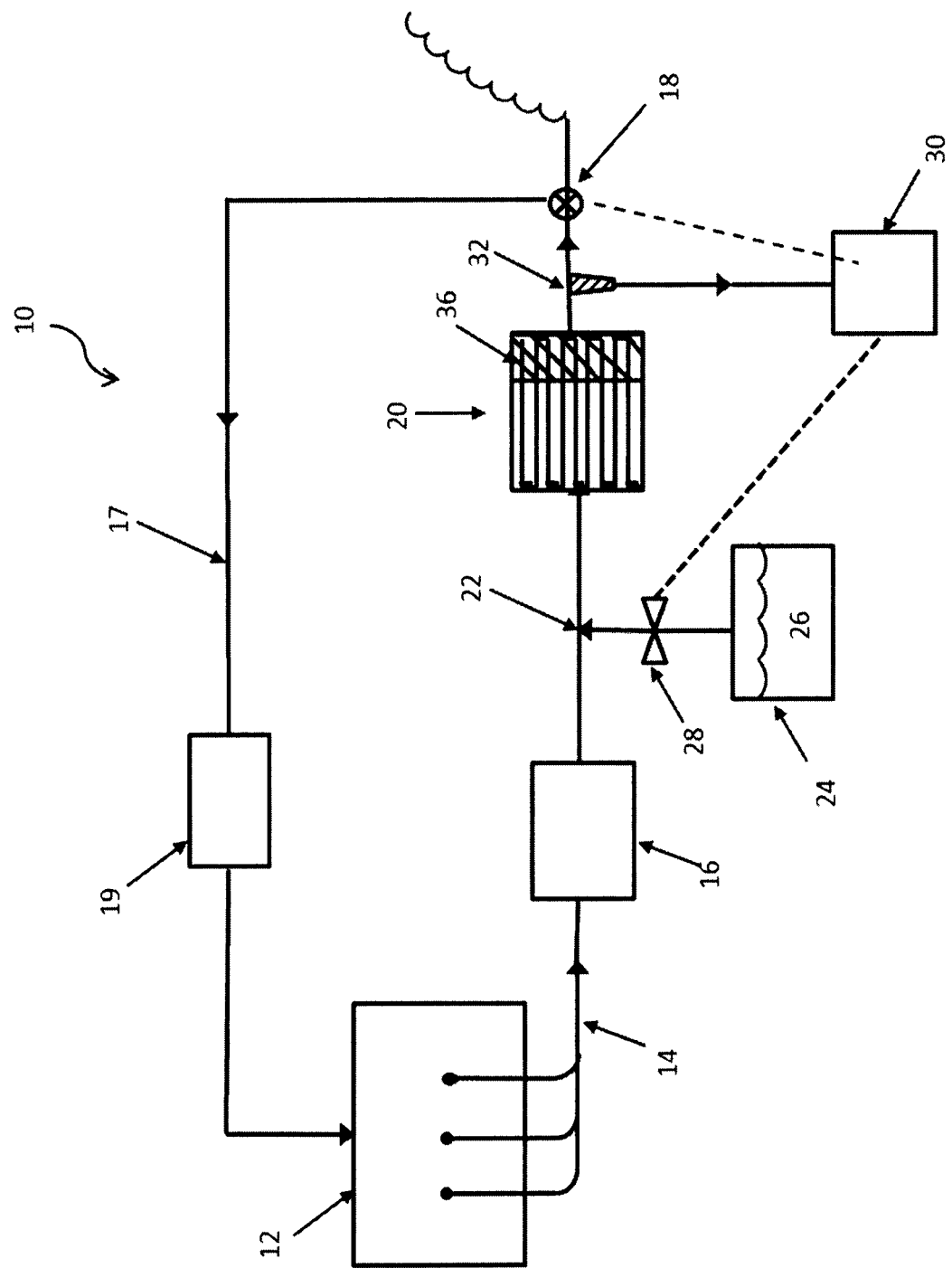

EXHAUST SYSTEM INCLUDING NOX REDUCTION CATALYST AND EGR CIRCUIT

CROSS-REFERENCE TO RELATED APPLICATIONS

This application is the U.S. National Phase application of PCT International Application No. PCT/IB2012/000308, filed Feb. 21, 2012, and claims priority benefit of U.S. Provisional Patent Application No. 61/444,881, filed Feb. 21, 2011, the disclosures of all of which are incorporated herein by reference in their entireties for all purposes.

FIELD OF THE INVENTION

The present invention relates to an exhaust system for a vehicular lean burn internal combustion engine that emits oxides of nitrogen and particulate matter (PM).

BACKGROUND OF THE INVENTION

Exhaust gas recirculation (EGR) is a method of reducing emissions of oxides of nitrogen ($NO_x$) from an engine by returning a portion of an engine's exhaust gas to the engine combustion chambers via the air intake. EGR works by lowering the oxygen concentration in the combustion chamber, thereby decreasing the peak temperature of the fuel combustion flame as well as through heat absorption. EGR is not a new technology—it has been used since the mid-1970s in gasoline fueled passenger car engines. Following the gasoline application, EGR was also introduced to diesel passenger cars and—from the early 2000s—to heavy-duty diesel engines.

Generally, there are two exhaust system arrangements comprising EGR: (i) high pressure loop EGR, in which the exhaust gas is recirculated from upstream of a turbocharger to ensure that exhaust gas will flow from the former to the latter; and (ii) low pressure loop EGR (also called long loop EGR), where exhaust gas is often recirculated from downstream of a particulate filter, allowing all the exhaust gas to be utilised in the turbo. Exhaust gas pressure downstream of the filter is generally lower than at the intake manifold, allowing exhaust gas to flow from the former to the latter location.

In use, particularly during cold start in a vehicle configured to meet the MVEG-A drive cycle, an EGR valve is set to recirculate approximately 50% of the exhaust gas to the engine. Exhaust gas emitted from the engine during EGR has a lower oxygen content but a no higher $NO_x$ content than exhaust gas recirculated from the exhaust system to the engine.

WO 2008/047170 discloses a method of reducing oxides of nitrogen ($NO_x$) present in a lean gas stream comprising nitric oxide (NO), the method comprising the steps of: (i) net adsorbing NO per se from the lean gas stream in an adsorbent comprising palladium and a cerium oxide at below 200° C.; (ii) thermally net desorbing NO from the NO adsorbent in a lean gas stream at 200° C. and above; and (iii) catalytically reducing $NO_x$ on a catalyst other than the NO adsorbent with a reductant selected from the group consisting of a hydrocarbon reductant, a nitrogenous reductant, hydrogen and a mixture of any two or more thereof. There is also disclosed a system for reducing $NO_x$ in a lean gas stream comprising NO, which system comprising an adsorbent for adsorbing NO per se from the lean gas stream at below 200° C., means for contacting the NO adsorbent with a lean gas stream at 200° C. and above thereby to desorb NO from the NO adsorbent and means for reducing NO desorbed from the NO adsorbent comprising a NO reduction catalyst and a source of reductant selected from the group consisting of a hydrocarbon reductant, a nitrogenous reductant, hydrogen and mixtures of any two or more thereof, wherein the NO adsorbent comprises palladium and a cerium oxide.

We now propose an exhaust system arrangement that can improve $NO_x$ conversion over a legislative drive cycle (such as the European MVEG-A drive cycle) and in real world conditions which can lower the $NO_x$ emissions from vehicular lean burn internal combustion engines relative to current commercial exhaust system arrangements.

SUMMARY OF THE INVENTION

The invention includes an exhaust system for a vehicular lean burn internal combustion engine that emits oxides of nitrogen ($NO_x$) and particulate matter (PM), and a lean-burn internal combustion engine containing the exhaust system. The system comprises a NO reduction catalyst and a source of reductant selected from the group consisting of a hydrocarbon reductant, a nitrogenous reductant, hydrogen and mixtures of any two or more thereof, a filter for removing PM from exhaust gas flowing in the exhaust system and a low pressure exhaust gas recirculation (EGR) circuit for connecting the exhaust system downstream of the filter to an air intake of the engine. The EGR circuit comprises a $NO_x$ adsorber catalyst (NAC) comprising a NO adsorbent. An advantage of this arrangement is that $NO_x$ reduction catalysts often are inactive for $NO_x$ reduction at temperatures below about 200° C. Additionally, where the $NO_x$ reduction catalyst reduces $NO_x$ using a urea reductant, it may not be possible to inject urea until the exhaust gas is sufficiently warm enough to decompose urea into $CO_2$ and ammonia, otherwise it risks clogging the downstream $NO_x$ reduction catalyst and/or the urea injector with solid deposits of urea. By adsorbing NO in an exhaust gas recirculation circuit at temperatures lower than a desired light-off temperature of the $NO_x$ reduction catalyst before thermally i.e. passively, releasing stored NO back into exhaust gas when the $NO_x$ reduction catalyst is active for $NO_x$ reduction, the system as a whole emits less $NO_x$, increasing design options for the skilled person to meet a relevant emission standard.

BRIEF DESCRIPTION OF THE DRAWING

FIG. 1 is a schematic flow diagram of one embodiment of the invention.

DETAILED DESCRIPTION OF THE INVENTION

The invention is an exhaust system that comprises a NO reduction catalyst and a source of reductant selected from the group consisting of a hydrocarbon reductant, a nitrogenous reductant, hydrogen and mixtures of any two or more thereof, a filter for removing PM from exhaust gas flowing in the exhaust system and a low pressure exhaust gas recirculation (EGR) circuit for connecting the exhaust system downstream of the filter to an air intake of the engine. The EGR circuit comprises a $NO_x$ adsorber catalyst (NAC) comprising a NO adsorbent.

The filter is preferably a wall-flow filter.

In one embodiment, the NO adsorbent consists of palladium and a cerium oxide or a mixed oxide or composite oxide containing cerium and at least one other transition metal, whereas in another embodiment, the NO adsorbent includes palladium dispersed on ceria or a mixed oxide or composite oxide containing cerium and at least one other transition metal. In a particular embodiment, the at least one other transition metal in the mixed oxide or composite oxide is zirconium.

Suitable palladium loadings in the NO adsorbent can be from 0.1 to 200 g/ft$^{-3}$ (0.0035 to 7.1 g/L). In one embodiment, the palladium loading on the cerium oxide or the composite oxide containing cerium is from 0.1 to 200 g/ft$^{-3}$ (0.0035 to 7.1 g/L), such as from 0.5 to 150 g/ft$^{-3}$ (0.018 to 5.3 g/L) or 1 to 120 g/ft$^{-3}$ (0.035 to 4.2 g/L).

"Composite oxide" as defined herein means a largely amorphous oxide material comprising oxides of at least two elements which are not true mixed oxides consisting of the at least two elements.

Materials comprising palladium and a cerium oxide can be obtained by known methods including, but not limited to, impregnation, the incipient wetness technique and co-precipitation. Co-precipitated materials can be obtained according to the methods disclosed in EP 0602865.

In another embodiment that can be used, though not exclusively, in treating $NO_x$ emitted from lean-burn internal combustion engines, particularly vehicular engines, the NO adsorbent is combined with a thermally regenerable $NO_x$ adsorbent for net adsorbing $NO_x$ at above about 200° C., and thermally net desorbing $NO_x$ at above 250° C. (i.e. net adsorbing from above about 200° C. up to about 250° C.), which thermally regenerable $NO_x$ absorbent comprising platinum and a metal oxide. In embodiments, the thermally regenerable $NO_x$ absorbent can comprise platinum dispersed on alumina and/or zirconia. An advantage of this embodiment is that it enables net $NO_x$ desorption to be delayed to higher temperatures (temperatures above about 250° C., such as 255° C., 260° C., 265° C. or 270° C.), at which a relevant NO reduction catalyst (e.g. a selective catalytic reduction catalyst using nitrogenous reductant) is more active (i.e. above light off temperature) for NO reduction, than at temperatures immediately above 200° C., or which enables ammonia precursors such as urea—which hydrolyzes or pyrolyzes more readily at higher temperatures—to be used.

As used herein the terms "absorb" and "adsorb" and any derivatives thereof have been used interchangeably, and the specification should be interpreted accordingly.

The NO adsorbent and the thermally regenerable $NO_x$ absorbent can be disposed in any suitable arrangement that provides this benefit. For example, in one embodiment a flow-through substrate monolith is coated with a zone at an inlet end of the substrate monolith with the NO adsorbent and at an outlet end of the substrate monolith with the thermally regenerable $NO_x$ absorbent. Alternatively, the NO adsorbent is present in an underlayer on a substrate monolith and the thermally regenerable $NO_x$ absorbent is present in a layer overlying the underlayer.

Suitable $NO_x$ reduction catalysts known in the art include lean $NO_x$ catalysts (also known as hydrocarbon-SCR catalysts), which can use hydrocarbon and/or hydrogen as reductant, or a $NO_x$ trap comprising an alkaline earth metal or alkali metal $NO_x$ adsorber component and a NO oxidation catalyst component, suitably comprising platinum, and optionally a $NO_x$ reduction catalyst component, such as rhodium. In a preferred embodiment, $NO_x$ reduction catalyst is a selective catalytic reduction (SCR) catalyst and the reductant is a nitrogenous reductant.

The filter and $NO_x$ reduction catalyst can be arranged in any suitable configuration. In one embodiment, the $NO_x$ reduction catalyst is located downstream of the filter. In this embodiment the means for introducing reductant into a flowing exhaust gas is suitably located between the filter and the $NO_x$ reduction catalyst, but may also be located upstream of the $NO_x$ reduction catalyst if arrangements are made to avoid combustion of the reductant on the filter.

In another embodiment, the $NO_x$ reduction catalyst is located on the filter. Where the filter is a wall-flow filter, the $NO_x$ reduction catalyst can be formulated as a washcoat that permeates the walls of the filter. This can be done, for example, by milling the catalyst to an average particle size of ≤5 μm. In this embodiment the means for introducing reductant into a flowing exhaust gas is suitably located upstream of the filter.

In a preferred embodiment, an oxidation catalyst for oxidising NO to nitrogen dioxide located upstream of the filter and/or the $NO_x$ reduction catalyst.

Preferably, the $NO_x$ reduction catalyst selectively catalyzes the reduction of $NO_x$ using a nitrogenous reductant. Suitable selective catalytic reduction catalysts include transition metal promoted molecular sieves such as aluminosilicate zeolites and silicoaluminophosphates. Suitable transition metal promoters include Cr, Ce, Mn, Fe, Co, Ni and Cu and mixtures of any two or more thereof. Preferred molecular sieve catalysts include CuCHA, such as Cu-SAPO-34, Cu-SSZ-13, and Fe-Beta zeolite, where either the Fe is present in the framework of the molecular sieve structure and/or otherwise associated e.g. ion-exchanged with the framework structure. Fe—WOx-$ZrO_2$ can be used as a active non-molecular sieve SCR catalyst.

The nitrogenous reductant for use in the system can be ammonia per se, hydrazine or an ammonia precursor selected from the group consisting of urea (($NH_2)_2CO$), ammonium carbonate, ammonium carbamate, ammonium hydrogen carbonate and ammonium formate.

The reductant for use in the system or method according to the invention is a suitable hydrocarbon reductant, nitrogenous reductant or hydrogen. In arrangements employing hydrocarbon reductant in the preferred use of the system according to the invention, the hydrocarbon reductant can be a hydrocarbon fuel that powers the engine. Where the reductant is a hydrocarbon fuel, it may be desirable to crack the fuel to form shorter chain hydrocarbons in order to promote more efficient $NO_x$ reduction. In this regard, Pd/$CeO_2$ is a particularly efficient catalyst for cracking hydrocarbon fuel.

Nitrogenous reductants can include ammonia per se, hydrazine or an ammonia precursor selected from the group consisting of urea (($NH_2)_2CO$), ammonium carbonate, ammonium carbamate, ammonium hydrogen carbonate and ammonium formate. Hydrogen can be generated in situ for example by contacting a hydrocarbon fuel with a suitable reformer catalyst or, where the gas comprises carbon dioxide and water, by contacting the gas stream with a suitable water-gas shift catalyst.

The reductant is added to the flowing exhaust gas by any suitable means for introducing the reductant into the exhaust gas. Suitable means include an injector, sprayer, or feeder, and is preferably an injector. Such means are well known in the art.

The system may comprise means for controlling the introduction of reductant into the exhaust gas in order to reduce $NO_x$ therein. In one embodiment, the control means comprises an electronic control unit, optionally an engine control unit. Furthermore, the control means may comprise a $NO_x$ sensor located downstream of the NO reduction catalyst.

According to a further aspect, the invention provides a lean-burn internal combustion engine comprising an exhaust system according to the invention. The lean-burn internal combustion engine can be a lean-burn gasoline or a diesel engine, but the engine may also run on alternative fuels such as liquid petroleum gas, natural gas or comprise bio-fuels or gas-to-liquid products. In a particular embodiment, the lean-burn internal combustion engine is a compression ignition engine powered e.g. by diesel fuel.

In order that the invention may be more fully understood, the following Examples are provided by way of illustration only and with reference to the accompanying drawing. cl EXAMPLE FIG. 1 is a schematic diagram of a vehicular lean-burn internal combustion engine comprising an exhaust system according to a first embodiment of the invention featuring a thermally regenerable NO adsorbent disposed in an exhaust gas recirculation circuit.

Referring to FIG. 1, there is shown a diesel engine 12 comprising an exhaust system 10 according to the present invention. The exhaust system comprises an exhaust line 14 wherein aftertreatment components are disposed in series. The NO oxidation catalyst 16 comprises a ceramic flow-through substrate monolith coated with a NO oxidation catalyst composition comprising a platinum rich combination of platinum and palladium supported on an alumina-based high surface area support material.

A ceramic wall-flow filter 20 comprising a washcoat of Cu-SSZ-13 selective catalytic reduction catalyst is disposed downstream of NO oxidation catalyst 16. An ammonia oxidation clean-up or slip catalyst 36 is coated on a downstream end of the SCR catalyst monolith substrate. Alternatively, the ammonia slip catalyst can be coated on a separate substrate located downstream of the SCR catalyst (not shown). Means (injector 22) is provided for introducing reductant fluid (urea 26) from reservoir 24 into exhaust gas carried in the exhaust line 14. Injector 22 is controlled using valve 28, which valve is in turn controlled by electronic control unit 30 (valve control represented by dotted line). Electronic control unit 30 receives closed loop feedback control input from a $NO_x$ sensor 32 located downstream of the SCR catalyst.

Low pressure exhaust gas recirculation circuit 17 comprises an exhaust gas recirculation valve 18 also controlled by the electronic control unit 30. Disposed within the exhaust gas recirculation circuit, NO adsorbent 19 comprises a ceramic flow-through substrate monolith coated with a NO adsorbent composition comprising palladium supported on ceria that net adsorbs NO from lean exhaust gas at up to about 200° C. and net desorbs NO in lean exhaust gas at temperatures above about 200° C.

In use, the palladium supported on ceria NO adsorbent 19 net adsorbs NO from exhaust gas flowing in exhaust gas in the exhaust gas recirculation circuit at temperatures of up to about 200° C., for example following cold start in the MVEG-A European drive cycle or during driving conditions that produce cooler exhaust gas, e.g. extended periods of idling in traffic. As the exhaust gas temperatures in the exhaust gas recirculation system rise, NO is thermally (i.e. passively) desorbed and passes to the engine intake and, following emission from the engine, a proportion of $NO_x$ derived from desorbed NO is reduced on the SCR catalyst 20 in the presence of ammonia derived from urea injected via injector 22. The ammonia slip catalyst 36 oxidises $NH_3$ that would otherwise be exhausted to atmosphere.

We claim:

1. An exhaust system for a vehicular lean burn internal combustion engine that emits oxides of nitrogen ($NO_x$) and particulate matter (PM), the system comprising a $NO_x$ reduction catalyst for reducing $NO_x$ in the presence of a reductant, means for introducing reductant into a flowing exhaust gas and a source of reductant selected from the group consisting of a hydrocarbon reductant, a nitrogenous reductant, hydrogen and mixtures of any two or more thereof, a filter for removing PM from exhaust gas flowing in the exhaust system and a low pressure exhaust gas recirculation (EGR) circuit for connecting the exhaust system downstream of the filter to an air intake of the engine, wherein the EGR circuit comprises a $NO_x$ adsorber catalyst (NAC) comprising a nitric oxide (NO) adsorbent, and wherein the NO adsorbent consists of palladium and a cerium oxide or a mixed oxide or composite oxide containing cerium and at least one other transition metal.

2. An exhaust system according to claim 1, wherein the at least one other transition metal in the mixed oxide or composite oxide is zirconium.

3. An exhaust system according to claim 1, wherein the NO adsorbent has a palladium loading ranging from 0.1 to 200 g/ft$^{-3}$.

4. An exhaust system according to claim 1, comprising an oxidation catalyst for oxidising NO to nitrogen dioxide located upstream of (i) the filter, (ii) the $NO_x$ reduction catalyst, or (iii) the filter and the $NO_x$ reduction catalyst.

5. An exhaust system according to claim 1, wherein the $NO_x$ reduction catalyst selectively catalyzes the reduction of $NO_x$ using a nitrogenous reductant.

6. An exhaust system according to claim 1, wherein the nitrogenous reductant is ammonia, hydrazine or an ammonia precursor selected from the group consisting of urea (($NH_2$)$_2$CO), ammonium carbonate, ammonium carbamate, ammonium hydrogen carbonate and ammonium formate.

7. An exhaust system according to claim 1, wherein the NO adsorbent is combined with a thermally regenerable $NO_x$ adsorbent for net adsorbing $NO_x$ at above 200° C. and net desorbing $NO_x$ at above 250° C. which thermally regenerable $NO_x$ absorbent comprising platinum and a metal oxide.

8. An exhaust system according to claim 7, wherein the thermally regenerable $NO_x$ absorbent comprises platinum dispersed on (i) alumina, (ii) zirconia, or (iii) alumina and zirconia.

9. An exhaust system according to claim 7, wherein the NO adsorbent is present in an underlayer and the thermally regenerable $NO_x$ absorbent is present in a layer overlying the underlayer.

10. An exhaust system according to claim 1, wherein the $NO_x$ reduction catalyst is located downstream of the filter.

11. An exhaust system according to claim 10, wherein the means for introducing reductant into a flowing exhaust gas is located between the filter and the $NO_x$ reduction catalyst.

12. An exhaust system according to claim 1, wherein the $NO_x$ reduction catalyst is located on the filter.

13. An exhaust system according to claim 12, wherein the means for introducing reductant into a flowing exhaust gas is located upstream of the filter.

14. An exhaust system according to claim 1, comprising means for controlling the introduction of reductant into the exhaust gas in order to reduce $NO_x$ therein.

15. An exhaust system according to claim 14, wherein the control means comprises an electronic control unit.

16. An exhaust system according to claim 14, wherein the control means comprises a $NO_x$ sensor located downstream of the NO reduction catalyst.

17. A lean-burn internal combustion engine comprising an exhaust system according to claim 1.

18. The lean-burn internal combustion engine according to claim 17, wherein said engine is a compression ignition engine.

19. An exhaust system for a vehicular lean burn internal combustion engine that emits oxides of nitrogen ($NO_x$) and particulate matter (PM), the system comprising a $NO_x$ reduction catalyst for reducing $NO_x$ in the presence of a reductant, means for introducing reductant into a flowing exhaust gas and a source of reductant selected from the group consisting of a hydrocarbon reductant, a nitrogenous reductant, hydrogen and mixtures of any two or more thereof, a filter for removing PM from exhaust gas flowing in the exhaust system and a low pressure exhaust gas recirculation (EGR) circuit for connecting the exhaust system downstream of the filter to an air intake of the engine, wherein the EGR circuit comprises a $NO_x$ adsorber catalyst (NAC) comprising a nitric oxide (NO) adsorbent, and wherein the NO adsorbent includes palladium dispersed on ceria or a mixed oxide or composite oxide containing cerium and at least one other transition metal.

20. An exhaust system according to claim 19, wherein the at least one other transition metal in the mixed oxide or composite oxide is zirconium.

21. An exhaust system according to claim 19, wherein the NO adsorbent has a palladium loading ranging from 0.1 to 200 g/ft$^{-3}$.

22. An exhaust system according to claim 19, comprising an oxidation catalyst for oxidising NO to nitrogen dioxide located upstream of (i) the filter, (ii) the $NO_x$ reduction catalyst, or (iii) the filter and the $NO_x$ reduction catalyst.

23. An exhaust system according to claim 19, wherein the $NO_x$ reduction catalyst selectively catalyzes the reduction of $NO_x$ using a nitrogenous reductant.

24. An exhaust system according to claim 19, wherein the nitrogenous reductant is ammonia, hydrazine or an ammonia precursor selected from the group consisting of urea (($NH_2$)$_2$ CO), ammonium carbonate, ammonium carbamate, ammonium hydrogen carbonate and ammonium formate.

25. An exhaust system according to claim 19, wherein the NO adsorbent is combined with a thermally regenerable $NO_x$ adsorbent for net adsorbing $NO_x$ at above 200° C. and net desorbing $NO_x$ at above 250° C., which thermally regenerable $NO_x$ absorbent comprising platinum and a metal oxide.

26. An exhaust system according to claim 25, wherein the thermally regenerable $NO_x$ absorbent comprises platinum dispersed on (i) alumina, (ii) zirconia, or (iii) alumina and zirconia.

27. An exhaust system according to claim 25, wherein the NO adsorbent is present in an underlayer and the thermally regenerable $NO_x$ absorbent is present in a layer overlying the underlay.

28. An exhaust system according to claim 19, wherein the $NO_x$ reduction catalyst is located downstream of the filter.

29. An exhaust system according to claim 28, wherein the means for introducing reductant into a flowing exhaust gas is located between the filter and the $NO_x$ reduction catalyst.

30. An exhaust system according to claim 19, wherein the $NO_x$ reduction catalyst is located on the filter.

31. An exhaust system according to claim 30, wherein the means for introducing reductant into a flowing exhaust gas is located upstream of the filter.

32. An exhaust system according to claim 19, comprising means for controlling the introduction of reductant into the exhaust gas in order to reduce $NO_x$ therein.

33. An exhaust system according to claim 32, wherein the control means comprises an electronic control unit.

34. An exhaust system according to claim 32, wherein the control means comprises a $NO_x$ sensor located downstream of the NO reduction catalyst.

35. A lean-burn internal combustion engine comprising an exhaust system according to claim 19.

36. The lean-burn internal combustion engine according to claim 35, wherein said engine is a compression ignition engine.

\* \* \* \* \*